United States Patent [19]

Nakajima et al.

[11] Patent Number: 5,016,913
[45] Date of Patent: May 21, 1991

[54] AIR BAG IN AIR BAG EQUIPMENT

[75] Inventors: Hideo Nakajima; Toshio Takamiya, both of Hikone, Japan

[73] Assignee: Takata Kabushiki Kaisha, Tokyo, Japan

[21] Appl. No.: 552,969

[22] Filed: Jul. 12, 1990

[30] Foreign Application Priority Data

Jul. 14, 1989 [JP] Japan .................................. 1-182153

[51] Int. Cl.$^5$ .............................................. B60R 21/30
[52] U.S. Cl. .................................... 280/738; 280/739; 280/743; 280/742
[58] Field of Search .............. 280/743, 739, 738, 742, 280/741; 244/99

[56] References Cited

U.S. PATENT DOCUMENTS 3,324,656 6/1967 Bradshaw .......................... 60/39.821
4,805,930 2/1989 Takada ................................ 280/739

Primary Examiner—Charles A. Marmor
Assistant Examiner—Mike Shaughnessy
Attorney, Agent, or Firm—Armstrong, Nikaido, Marmelstein, Kubovcik & Murray

[57] ABSTRACT

The air bag 3 according to this invention is furnished with exhaust outlet 6 to discharge internal gas, and the material 8 with and heat-shrinking property is provided, which blocks at least a part of the exhaust outlet 6 in normal case and shrinks to such direction as to increase the passage area of said exhaust outlet when reaction gas is introduced from the inflator 2. Therefore, the passage area of the exhaust outlet 6 is relatively narrowed down by the heat-shrinking material 8 in normal case. For this reason, it is rapidly expanded by reaction gas from the inflator 2. Thereafter, the material 8 is shrinked by the heat of reaction gas and the passage area of exhaust outlet 6 is increased. Thus, more reaction gas flows out of air bag 3, and this alleviates the impact when the air bag 3 receives the person in the vehicle. In this case, the shrinking degree of the material 8 varies according to the ambient temperature, and the internal pressure of the air bag 3 is maintained at almost constant level regardless of atmospheric temperature. As a result, the air bag 3 can receive the person in the vehicle always in stable condition.

1 Claim, 2 Drawing Sheets

AIR BAG IN AIR BAG EQUIPMENT

BACKGROUND OF THE INVENTION

The present invention relates to an air bag in an air bag equipment, which is expanded by reaction gas from an inflator when a vehicle is collided, and protects a person in the vehicle, and in particular to an air bag provided with an exhaust outlet to discharge the gas gradually in order to alleviate the impact when such person hits the air bag.

The air bag equipment as installed on a fixed portion of a car body in front of a car seat plays an important role for the protection of a person in the car from injury due to the collision of the car body as the air bag is instantaneously inflated at the collision of the vehicle by the pressure of reaction gas released from an inflator, which is fixed on a stearing wheel or dashboard.

In such air bag equipment 1, for example, chemical reaction of gas generating agent is induced by a collision signal from a collision detection sensor when the vehicle deceleration is higher than a predetermined level as shown in FIG. 5. It comprises an inflator 2 to inject the reaction gas, and an air bag 3, the base of which is fixed on the inflator 2 and which is inflated by the gas injected from the inflator 2. This air bag equipment is mounted on a fixed portion of a car body such as the central portion of the steering wheel 5 with the air bag folded up and accommodated in a pad 4.

As shown in FIG. 6, the gas generating agent in the inflator 2 starts the reaction when the vehicle is collided, and the air bag 3 is instantaneously expanded by the reaction gas thus generated. The air bag receives the person M, who is thrown forward by inertia, and protects him from the collision with the car body.

When the person M is collided with and received by the air bag 3 inflated at the collision of the car, the pressure in the air bag 3 is relatively high, and the impact caused by the collision is big. In order to alleviate such impact, an exhaust outlet is provided on the air bag 3. By gradually releasing high pressure gas of the air bag 3 from this exhaust outlet 6, the impact due to the collision of the person M with air bag 3 is absorbed.

In the meantime, the vehicle provided with such air bag equipment 1 is driven at various places. Specifically, the vehicle is driven in an area at high temperature such as the equatorial area or in an area at extremely low temperature such as Siberia. When the atmospheric temperature extremely differs according to the place where the vehicle is driven, the condition for chemical reaction of the gas generating agent changes according to the temperature. Thus, the reaction condition of the gas generating agent in the inflator 2 also varies. Namely, in a high temperature area, the reaction is not only quick, but the internal pressure of the air bag is high because it is inflated due to high temperature of gas, while, in a low temperature area, internal pressure of the air bag is not very high because temperature of reaction gas is low. As the result, the time required for complete expansion of the air bag 3 extremely differs according to the place where the vehicle is driven. In general, the time required for complete expansion of air bag 3 is about 30 ms at normal temperature, about 25 ms at high temperature and about 40 ms at low temperature.

On the other hand, when the vehicle speed is 48 km/h, the time from the collision of the vehicle until the person M in the vehicle hits the steering wheel 5 is about 50–70 msec and the time until the person hits the instrument panel or windshield is about 70–90 ms. This time does not depend on the atmospheric temperature.

Therefore, when the person M hits the inflated air bag after the collision of the vehicle, internal pressure of air bag 3 differs according to the temperature of atmospheric air. In other words, the time required until the complete expansion of air bag 3 is short in a high temperature area, and the internal pressure of air bag 3 is amply high when the person M hits air bag 3, whereas, in a low temperature area, the time up to the complete expansion of air bag 3 is long, and internal pressure of air bag 3 is relatively low when the person M hits the air bag 3. In this way, internal pressure of air bag 3 varies according to the temperature of atmospheric air.

When the air bag 3 is furnished with an exhaust outlet 6 as described above, a part of reaction gas introduced from the inflator 2 during the inflating process of air bag 3 is discharged from the exhaust outlet 6. This results in pressure loss, and longer time is required until the air bag is completely expanded.

SUMMARY OF THE INVENTION

It is an object of the present invention to offer a system, in which a person in a vehicle is received by an air bag with constant and stable internal pressure regardless of the atmospheric temperature.

Another object of this invention is to provide a system, in which pressure loss during expansion of air bag is minimized, and the time up to the complete expansion of air bag is shortened, and, when a person in the vehicle is received by air bag, the impact on the person is effectively alleviated and absorbed.

To attain such objects, the system according to the present invention is characterized in that heat-shrinking material is provided, which blocks at least a part of said exhaust outlet in normal case and shrinks to such direction as to increase the area of the passage in exhaust outlet when reaction gas is introduced from the inflator.

When the air bag of this invention is used, the area of the passage in the exhaust outlet is relatively narrowed down or the exhaust outlet is closed because at least a part of the exhaust outlet is blocked by heat-shrinking material. As a result, when reaction gas is introduced into the air bag from the inflator, the reaction gas either does not flow out through the exhaust outlet or flows out only in small quantity. Accordingly, the air bag is efficiently expanded, and the time up to the complete expansion of the air bag is shortened.

On the other hand, the reaction gas introduced into the air bag is at considerably high temperature, while the area of the passage in the exhaust outlet is gradually increased because the heat-shrinking material on the exhaust outlet is shrinked by the heat of reaction gas. In this case, reaction speed of gas generating agent and gas temperature vary according to atmospheric temperature, and the heat quantity of reaction gas also changes according to the atmospheric temperature. Specifically, in a high temperature area, reaction gas is generated rapidly and the heat quantity of reaction gas is relatively high because atmospheric temperature is high, while, in a low temperature area, reaction gas is generated slowly and the heat quantity of reaction gas is relatively low because atmospheric temperature is low. Because the shrinking degree and shrinking speed of the material vary according to the heat of the reaction gas, the material shrinks according to the atmospheric temperature.

Namely, when the vehicle is driven in a high temperature area, the material is shrinked extensively and rapidly, and the area of the passage in exhaust outlet is increased in a short time, while, when the vehicle is driven in a low temperature area, the material is shrinked relatively slightly and slowly. As the result, in the high temperature area, a part of the reaction gas is discharged from the exhaust outlet relatively in large quantity and rapidly, while, in low temperature area, a part of the reaction gas is discharged from the exhaust outlet relatively in small quantity and slowly. Therefore, the internal pressure of air bag is maintained almost at constant level regardless of whether the vehicle is driven in a high temperature or a low temperature area.

Thus, when the internal pressure of the air bag is maintained almost at constant level, the impact on the person when received by the air bag is also at constant level, and the air bag can receive the person always in stable condition regardless of atmospheric temperature.

Still other objects and advantages of the invention will in part be obvious and will in part be apparent from the specification.

The invention accordingly comprises the features of construction, combinations of elements, and arrangement of parts which will be exemplified in the constrution hereinafter set forth, and the scope of the invention will be indicated in the claims.

DESCRIPTION OF THE PREFERRED EMBODIMENTS

In the following, description will be given on the embodiments of the invention in connection with the drawings.

Figure 1:
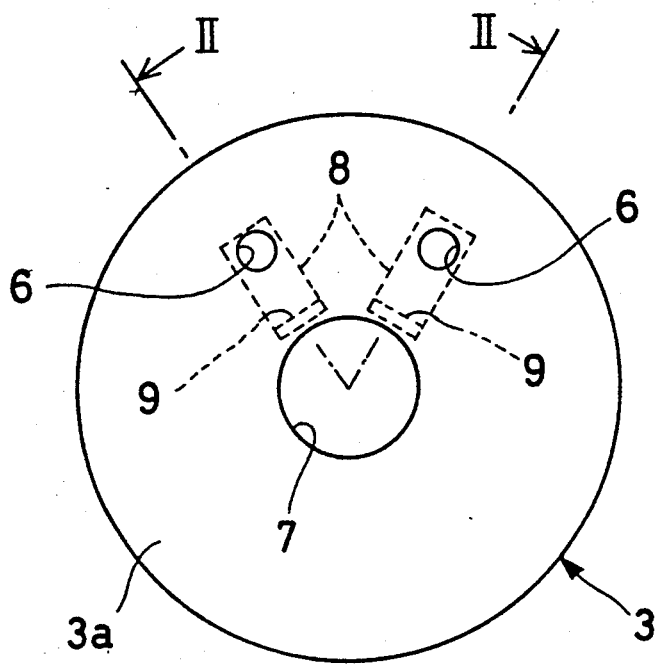
FIG. 1 is a front view of an air bag according to the present invention.
Figure 2:
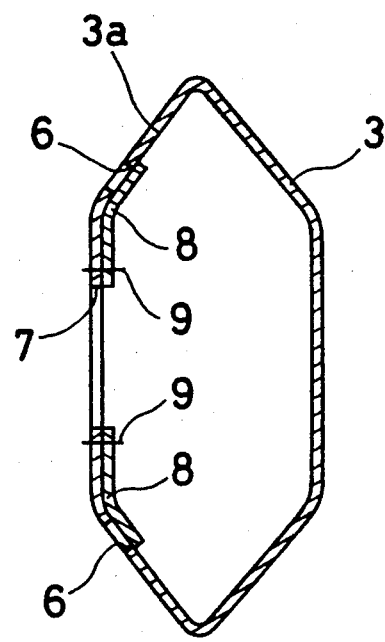
FIG. 2 is a sectional view of the air bag along the line II - II in FIG. 1.

As shown in FIG. 1, the air bag 3 is furnished with an inflator mounting hole 7 to receive an inflator and with a pair of exhaust outlets 6 and 6. On the internal surface of the air bag 3, a pair of materials 8 and 8 in approximately rectangular shape are provided to block a pair of exhaust outlets 6 and 6. In this case, the exhaust outlet 6 is arranged on one end of the material 8 as shown in FIG. 2 in detail, and only the other end of the material 8 is sewn up on a basic cloth 3a of the air bag 3 by thread 9. The material 8 consists, for example, of nylon woven cloth coated with neoprene rubber or silicone rubber or of heat-shrinking material such as plastic film with heat-shrinking property.

Figure 3:
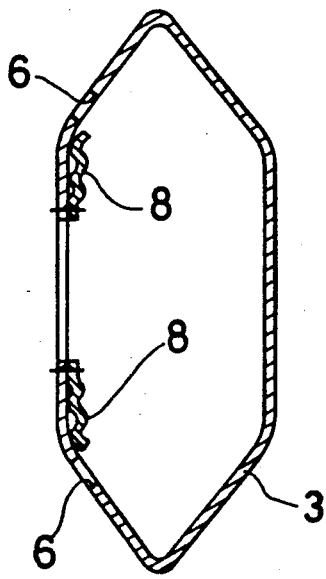
FIG. 3 is a sectional view just as FIG. 2, showing the air bag in expanded condition when atmospheric temperature is high.

In such an air bag 3, reaction gas is generated rapidly when the inflator is operated at the collision of the vehicle as it is driven in a high temperature area. As the result, the air bag 3 is expanded rapidly, and the heat quantity of reaction gas is also very high. Because the material 8 is rapidly shrinked by this heat as shown in FIG. 3, the exhaust outlet 6 is opened quickly. Accordingly, the sectional area of the passage in the exhaust outlet 6 is quickly increased, and a relatively large quantity of reaction gas is discharged to the outside. Thus, the internal pressure in the air bag 3 is not increased very much and the air bag remains in almost the predetermined size.

Figure 4:
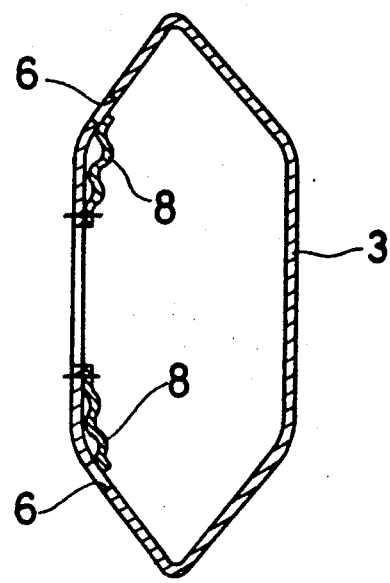
FIG. 4 is a sectional view just as FIG. 2, showing the air bag in expanded condition when atmospheric temperature is low.
Figure 5:
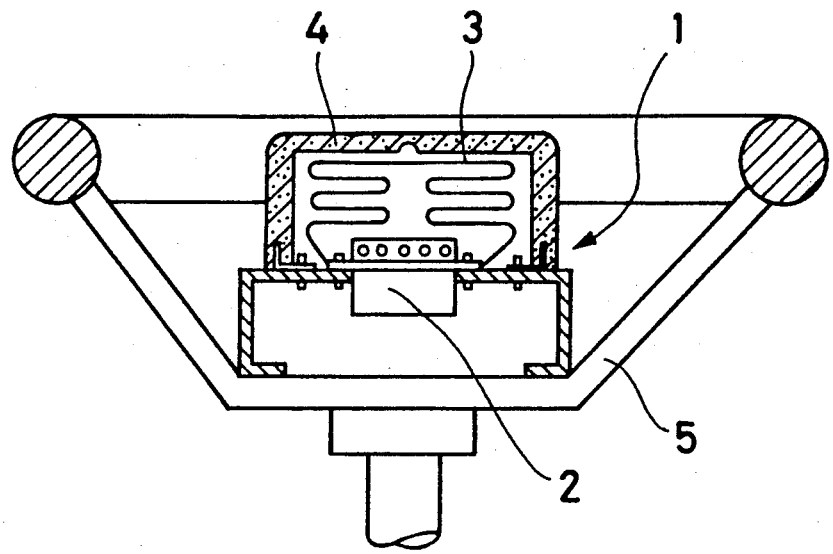
FIG. 5 is a schematical sectional view of an example of an air bag equipment when it is mounted on a steering wheel.
Figure 6:
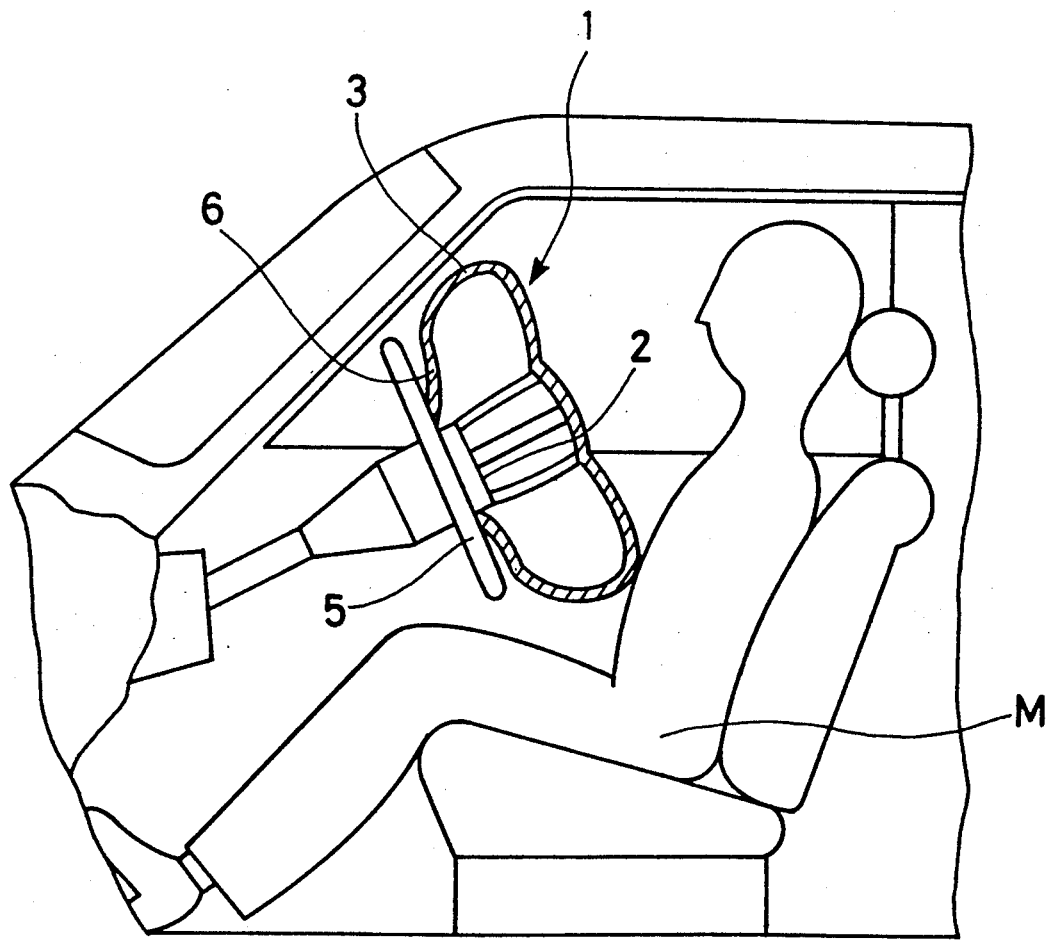
FIG. 6 is a drawing to represent the air bag in the expanded condition.

On the other hand, when the inflator is operated at the collision of the vehicle driven in a low temperature area, the reaction gas is generated relatively slowly. As the result, the air bag 3 is expanded relatively slowly, and the heat quantity of reaction gas is not so high. Because the material 8 is slowly shrinked by this heat as shown in FIG. 4, the exhaust outlet 6 is opened slowly. Therefore, the sectional area of the passage of the exhaust outlet 6 is not increased very much, and a relatively small quantity of reaction gas is discharged to the outside. The pressure in the air bag 3 is not decreased very much, and it is maintained approximately in the predetermined size.

The material 8 with heat-shrinking property has a different shrinking speed according to the temperature, i.e. it shrinks according to the atmospheric temperature of the area where the vehicle is driven. Therefore, the pressure in the air bag 3 is maintained almost at constant level regardless of the place where the vehicle is driven.

Consequently, the air bag 3 is provided with a stable receiving property without depending upon atmospheric temperature.

The present invention is not limited to the above embodiments, and various design modifications and variations are conceivable.

For example, the exhaust outlet 6 is completely blocked by the material 8 in normal case in the above embodiment, while the exhaust outlet 6 may be slightly opened without being blocked completely. Or, the material 8 is provided for each pair of exhaust outlets 6, while a common material may be used for all exhaust outlets. Further, the material 8 may be provided as a reinforcing material to strengthen the mounting portion of the air bag 3 on the inflator.

In the embodiment as described above, the material 8 is sewn up on the basic cloth 3a, while the material 8 may be bonded together with the basic cloth 3a by welding or bonding.

[Effect of the invention]

As it is evident from the above description, the area of the passage of exhaust outlet is changed by the heat-shrinking material according to the atmospheric temperature, and the internal pressure of the air bag is maintained almost at constant level without being influenced by atmospheric temperature.

Because the internal pressure of the air bag is maintained at almost constant level without being influenced by atmospheric temperature, the exhaust outlet can be formed in relatively large size. Thus, it is possible to form the exhaust outlet relatively easily without increasing the accuracy very much.

Further, because unnecessary leakage of reaction gas from the inflator can be prevented during the expansion process of the air bag, there is no need to increase the capacity of the inflator. Therefore, it is possible to provide the inflator in a small size.

What we claim is:

1. An air bag in an air bag equipment, comprising and exhaust outlet to discharge internal gas and alleviating the impact of collision when a person in a vehicle equipped with said air bag equipment hits the air bag by decreasing pressure through discharge of internal gas from the exhaust outlet, characterized in that a material with heat-shrinking property is provided, to block at least part of said exhaust outlet in a normal case and which shrinks in a direction so as to increase the passage area of said exhaust outlet when reaction gas is introduced from the an inflator.

* * * * *